(12) United States Patent
Picot et al.

(10) Patent No.: US 10,919,501 B2
(45) Date of Patent: Feb. 16, 2021

(54) TELESCOPIC CLEANING DEVICE

(71) Applicant: Valeo Systèmes d'Essuyage, Le Mesnil Saint Denis (FR)

(72) Inventors: Philippe Picot, Issoire (FR); Jordan Vieille, Issoire (FR); Sébastien Rollet, Issoire (FR); Grégory Kolanowski, Issoire (FR); Giuseppe Grasso, Issoire (FR); Xavier Bousset, Issoire (FR); Maxime Baudouin, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 158 days.

(21) Appl. No.: 15/960,935

(22) Filed: Apr. 24, 2018

(65) Prior Publication Data

US 2018/0304862 A1    Oct. 25, 2018

(30) Foreign Application Priority Data

Apr. 25, 2017   (FR) ...................................... 17 53576

(51) Int. Cl.
| | |
|---|---|
| B60S 1/56 | (2006.01) |
| B08B 3/10 | (2006.01) |
| B60S 1/46 | (2006.01) |
| B08B 3/02 | (2006.01) |
| B60S 1/52 | (2006.01) |

(52) U.S. Cl.
CPC .................. *B60S 1/56* (2013.01); *B08B 3/02* (2013.01); *B08B 3/10* (2013.01); *B60S 1/46* (2013.01); *B60S 1/528* (2013.01); *B08B 2203/007* (2013.01)

(58) Field of Classification Search
None
See application file for complete search history.

(56) References Cited

U.S. PATENT DOCUMENTS

2003/0222156 A1*  12/2003  Bissonnette ............ B60S 1/481
                                                              239/284.1

FOREIGN PATENT DOCUMENTS

| | | |
|---|---|---|
| DE | 4237856 C1 | 10/1993 |
| DE | 102009006280 A1 | 7/2010 |
| EP | 3121070 A1 | 1/2017 |

OTHER PUBLICATIONS

Espacenet translation DE102009006280 A1, Metschke (Year: 2010).*

(Continued)

*Primary Examiner* — Cristi J Tate-Sims
(74) *Attorney, Agent, or Firm* — Osha Bergman Watanabe & Burton LLP

(57) ABSTRACT

A telescopic cleaning device, for a glass surface to be cleaned of a motor vehicle, includes at least one hollow conveying body (5) for the cleaning fluid, closed at an upstream end by an inlet flange (12) and accommodating a movable piston (8) which is configured so as to slide in said hollow conveying body (5).
The hollow conveying body (5) additionally accommodates a rod (14) which extends jutting out from the inlet flange and around which the movable piston is capable of sliding, the movable piston and/or the rod being configured so as to allow the fluid to flow between them from the inlet flange to the distribution element.
The rod comprises a heating device (22), which comprises at least one heating element (24) extending in the interior of a heat conducting tube (26), along the axis of elongation (X) of the device.

12 Claims, 4 Drawing Sheets

(56) References Cited

OTHER PUBLICATIONS

Figure 1:
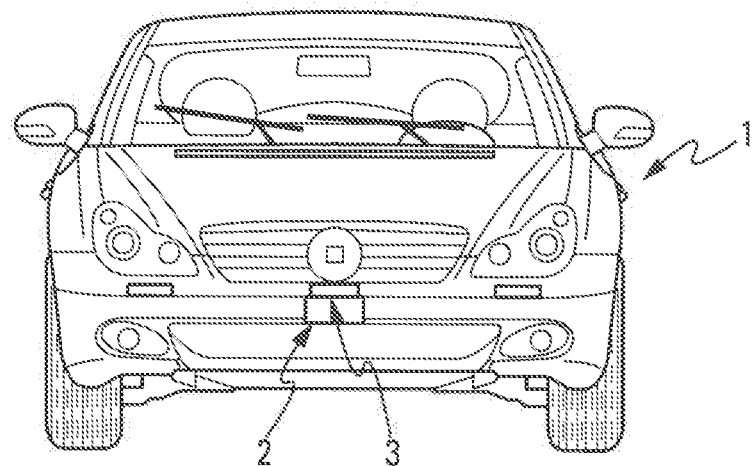

Espacenet translation DE4237856 C1, Frey (Year: 1993).*
Preliminary Report with Opinion Issued in Corresponding French Application No. 1753576, dated Mar. 20, 2018 (8 Pages).

* cited by examiner

TELESCOPIC CLEANING DEVICE

The present invention relates to the area of optical detection systems which are intended to be fitted in a motor vehicle. It concerns more specifically the cleaning devices which are intended for projecting at least one cleaning or drying fluid onto an optical surface to be cleaned of an optical sensor of such an optical detection system.

Any system comprising optical sensors such as cameras, laser sensors or other sensors based on the emission and/or detection of light in the spectrum visible or invisible to humans, in particular infrared, is called an optical detection system.

The function of such detection systems is to collect data on the environment of the motor vehicle so as to supply the driver with assistance for driving and/or maneuvering said vehicle. So that said assistance is efficient, the data supplied by the optical detection system must be of the best possible quality, and it is therefore essential to arrange specific sensors to realize said data acquisitions. To do this, a cleaning device can be controlled in order to project, onto an optical surface of a sensor of the optical detection system (for example the lens of a camera), one or several cleaning and/or drying fluids before the detection is carried out (for example the camera shot). Such cleaning devices can comprise at least one fluid conveying body formed by a movable part, constituted by a piston accommodated in an actuator cylinder, and capable of moving from a retracted position of rest to an extended cleaning position. In such an embodiment, the conveying body is usually connected, at its upstream end, and by means of a flexible supply conduit, to a tank for storing cleaning and/or drying fluid or fluids, and is connected at its downstream end, opposite to its upstream end, to a device for distributing and projecting cleaning and/or drying fluid or fluids.

It has been noted that it could be desirable to heat the cleaning fluid before it is projected onto the optical surface to be cleaned.

The invention falls within this context and aims to propose an improvement to existing solutions relative to the devices for cleaning by projection of a heated cleaning fluid onto an optical surface to be cleaned. The aim of the invention is thus to propose a cleaning device which is intended for projecting at least one fluid onto a surface to be cleaned of a motor vehicle, such as an optical surface of an optical sensor of an optical detection system, which, by means of a compact telescopic arrangement, allows the operation of the optical sensor not to be impeded and which, by means of the arrangement of a heating device, allows the cleaning power of the projected fluid to be increased such that the effectiveness of the cleaning and of the defrosting of the optical surface to be cleaned are improved.

The first object of the invention is a telescopic cleaning device which is intended for projecting at least one cleaning and/or drying fluid onto a glass surface to be cleaned of a motor vehicle, such as an optical surface of an optical sensor of an optical detection system for vehicles, said cleaning device including at least one hollow conveying body for the cleaning fluid, closed at an upstream end by an inlet flange and accommodating a movable piston which is configured so as to slide in the hollow conveying body, parallel to an axis of elongation of the hollow body, the movable piston, hollowed out by an inner distribution conduit, being the carrier of a fluid distribution element at a downstream end.

According to the invention, the hollow conveying body additionally accommodates a rod which extends jutting out from the inlet flange along the axis of elongation and around which the movable piston is capable of sliding, the movable piston and the rod being configured so as to allow the fluid to flow between them, depending on the position of the movable piston with respect to the rod, from the inlet flange to the distribution element, and the rod comprises a heating device, said heating device comprising at least one heating element extending in the interior of a heat conducting tube, along the axis of elongation.

A glass surface, or an optical surface, is to be understood as a surface that is transparent to electromagnetic rays emitted by an optical sensor, notably within the framework of detecting the distance of a vehicle or of an object in the proximity of the vehicle fitted with the cleaning device according to the invention.

According to different characteristics of the invention, taken on their own or in combination, it can be provided that:
  the heat conducting tube defines an outside casing of the rod, the fluid flowing between the rod and the movable piston being set to flow against the outside wall of the heat conducting tube;
  the heating element extends in the interior of the rod from the inlet flange;
  the heating element extends up to the free end of the rod opposite the inlet flange;
  the heating element is a resistive wire; it is understood that the heating element comprises here electric wires surrounded by an insulating sheath, the assembly formed by the wires and the insulating sheath being accommodated in the interior of the heat conducting tube;
  the resistive wire forms a loop in the interior of the heat conducting tube; the loop can notably be in the vicinity of the free end of the rod opposite the inlet flange; the resistive wire can notably be arranged so as to extend out and back in a U-shaped manner;
  the rod comprises an essentially cylindrical nozzle which comprises means for holding the heating element; the nozzle can notably be arranged at the free end of the rod opposite the inlet flange;
  a peripheral recess is arranged at the periphery of the nozzle in order to accommodate a sealing element;
  the nozzle is secured to a downstream end of the heat conducting tube by crimping or screwing or fitting;
  a filling material, notably of resin or gel type, is arranged at least partially in the interior of the heat conducting tube in order to fix the position of the heating element;
  the heat conducting tube is metallic, notably made of brass or aluminium;
  the nozzle is made of plastic material.

According to a series of characteristics of the invention, it can be provided that:
  through-channels are arranged in the inner wall of the distribution conduit of the movable piston so as to be able to control the flow rate of the cleaning fluid in the cleaning device, from its inlet into the intake chamber to its projection by the distribution element; said through-channels can be arranged parallel to one another and around the axis of elongation of the telescopic cleaning device;
  each through-channel has an axial dimension (height of a channel in the direction of the longitudinal axis of elongation of the movable piston) and/or a radial dimension (depth of the channel within the thickness of the inner wall of the movable piston) which is identical and/or separate from that of neighbouring channels; it is understood that when the movable piston is in the fully retracted position, each through-channel is covered integrally and in a sealed manner by the rod so as to block the flow of cleaning fluid, whereas, when the movable piston adopts an intermediate position up to attaining its fully extended position, at least one end of a through-channel is unobstructed so as to allow the flow of cleaning fluid from the intake chamber to the distribution element;

the distribution element for the cleaning and/or drying fluid comprises a distribution bar, essentially rectangular in form, which extends symmetrically on both sides of the axis of elongation of the fluid conveying body in a direction which is transverse to that of said axis of elongation;

the distribution bar is fitted with an additional heating device which is independent of the heating device that is present in the rod and is constituted by an additional heating wire which is separate from the heating element accommodated in the rod; the additional heating wire is connected electrically to an electric power supply by means of a connector.

According to a series of characteristics of the invention, specific to the distribution bar, and which can therefore be combined with the characteristics relative to the hollow conveying body and to the arrangement of the heating device in the rod which serves as guide means for the movable piston, it can be provided that:

the distribution bar is constituted by a first part forming a base which is capable of being assembled with a second part forming a cover so as to define a fluid distribution channel;

the base and the cover are assembled together by welding;

the base is connected to the hollow conveying body by an end portion which has an elongated form, centred on the axis of elongation and which essentially extends the hollow conveying body in a coaxial manner;

the base comprises, on its inside face, specifically the face facing the cover and being instrumental in defining the fluid distribution channel, the additional heating wire of the additional heating device and a plurality of fluid distribution openings distributed along the fluid distribution channel;

the base also comprises, on said inside face, a plurality of points for holding the additional heating wire so as to make the additional heating wire adopt a trajectory with a form which is essentially similar to that of the fluid distribution channel;

the length of the additional heating wire outside the distribution bar is adjusted so as to allow the movable piston of the telescopic cleaning device to move into its fully extended position;

at least one passage opening, for entry and exit respectively of the additional heating wire, is arranged in the base of the distribution bar, for example in the vicinity of the end portion, so as to allow the additional heating wire to pass through;

a filling material, of resin or gel type, can be added onto the upstream face of the distribution portion in order to ensure the seal between the base, the passage opening and the additional heating wire.

According to other characteristics of the invention, which, if need be, can complement one or other of the characteristics listed previously, it is possible to provide that the cleaning device comprises:

a fluid intake nozzle, which is formed jutting out from the inlet flange and is offset with respect to the axis of elongation of the cleaning device on which is centred the hollow fluid conveying body into which it opens out;

elastic resetting means, preferably a compression spring, which are accommodated in the hollow conveying body in order to bear against the movable piston, opposite the intake chamber, and in order to aim to reset the movable piston into the fully retracted position.

A second object of the invention concerns an optical detection system which is intended to be fitted in a motor vehicle and comprises at least one optical sensor which is provided with an optical surface, the optical detection system being specific in that it comprises a telescopic cleaning device such as described previously, which is intended for projecting at least one cleaning and/or drying fluid onto the optical surface.

The cleaning device comprises at least one rod which is fitted with a heating device and it can comprise, if need be, a fluid distribution bar which is fitted with an additional heating device that is independent of the first heating device.

In an advantageous manner, the optical detection system can comprise, upstream of the heating cleaning device according to the invention, a heating conduit for conveying fluid inside which extends a resistive wire which is connected to a connector.

A third object of the invention concerns a motor vehicle which is fitted with at least one optical detection system which is fitted with a cleaning device such as described previously, intended for projecting at least one cleaning and/or drying fluid onto a glass surface to be cleaned of a motor vehicle, such as an optical surface of an optical sensor.

Figure 2:
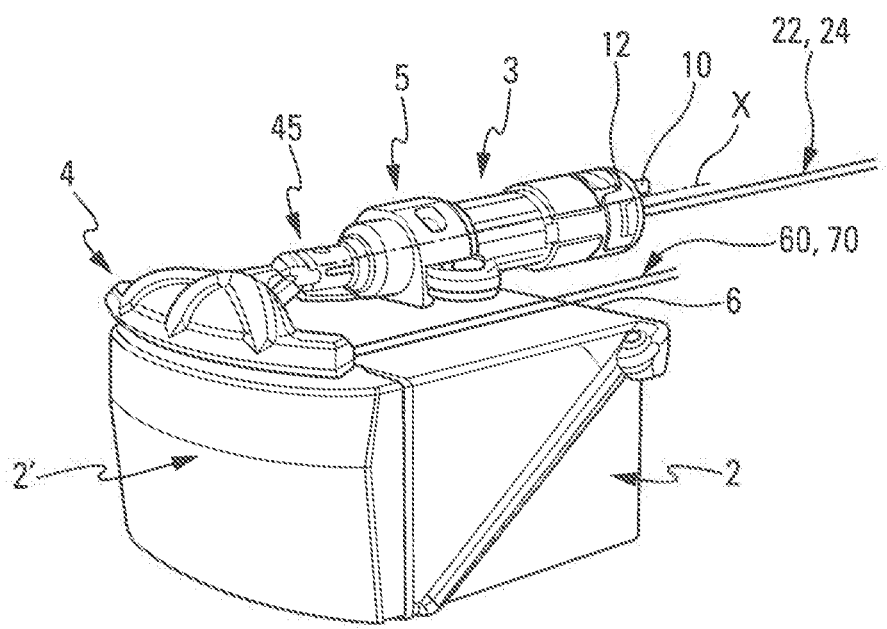
Figure 3:
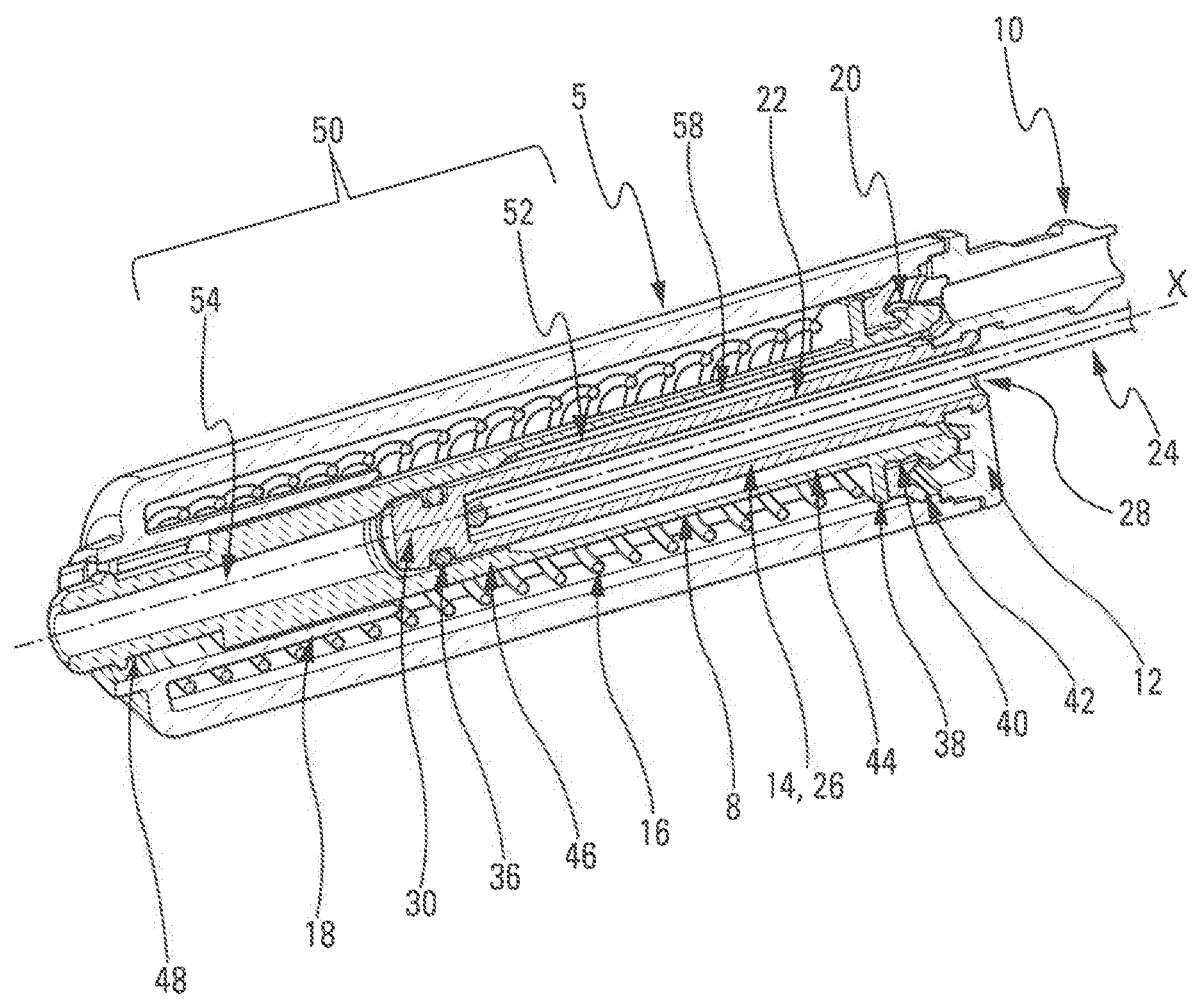
Figure 4:
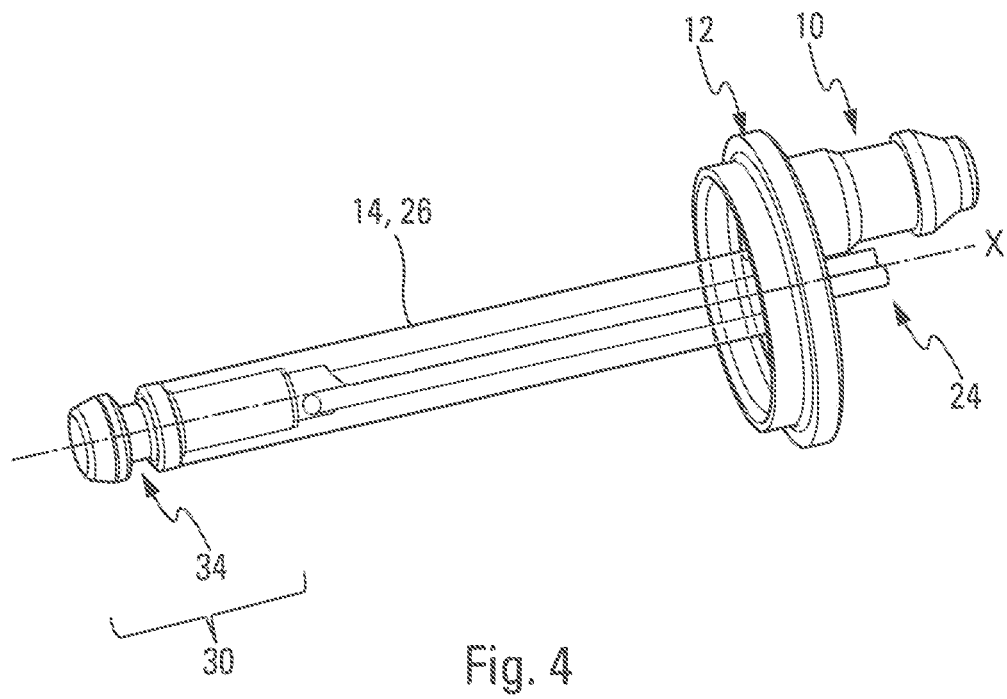
Figure 5:
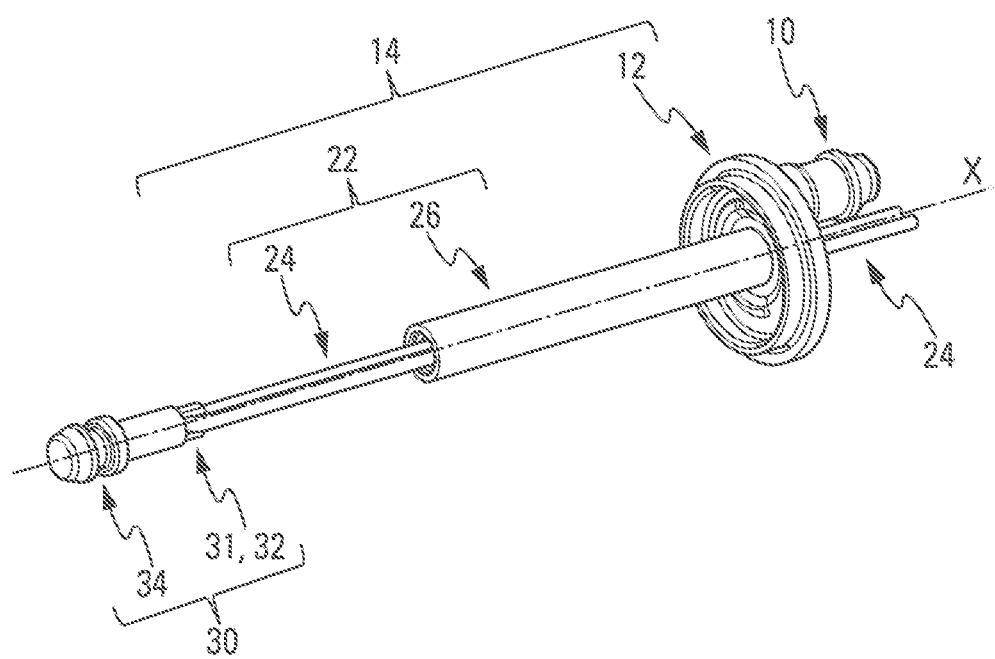
Figure 6A:
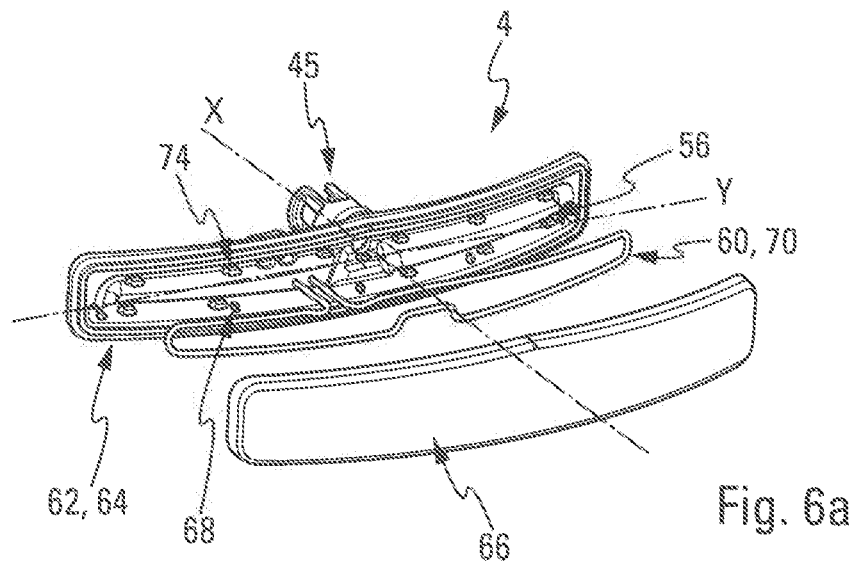
Figure 6B:
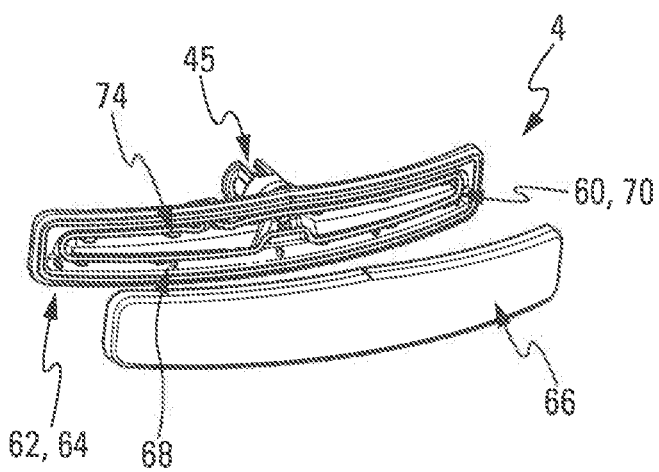
Figure 6C:
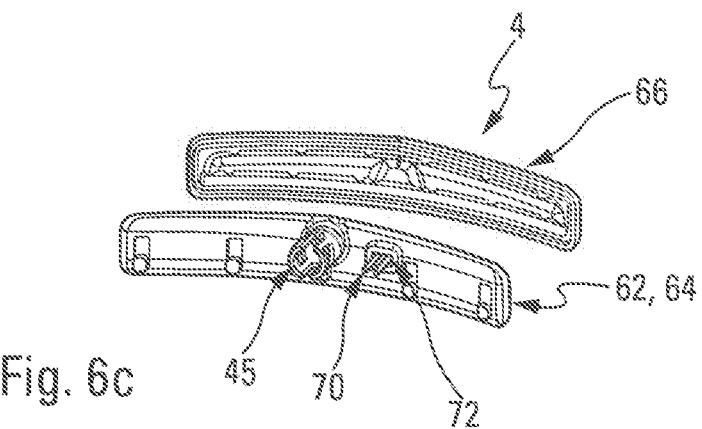

Other characteristics and advantages of the invention will appear more clearly on reading the detailed description of the embodiments of the invention, given below by way of illustrative and non-limiting examples and drawing on the accompanying figures, in which the telescopic cleaning device is shown according to one aspect of the invention, intended for projecting at least one cleaning and/or drying fluid onto a glass surface to be cleaned of a motor vehicle, and among which:

FIG. 1 is a front view of a vehicle where a detection system is installed comprising at least one cleaning device according to the invention, FIG. 2 is a schematic view in perspective of an embodiment of the cleaning device and of the associated optical sensor in an arrangement of a detection system according to the invention, the cleaning device comprising a distribution bar at the end of a hollow conveying body, FIG. 3 is a sectional view, in a section plane comprising the longitudinal axis (X), of part of the cleaning device according to the invention showing the cooperation between constituent elements of said device, more particularly the cooperation between a rod, comprising a first heating device, and a movable piston, shown here in the fully retracted position or in the rest position, inside the hollow conveying body shown in FIG. 2, FIGS. 4 and 5 are views of the rod of the telescopic cleaning device according to the invention comprising a first heating device, FIG. 4 being a view of said heating device in the assembled state, FIGS. 6a, 6b, 6c are exploded views, respectively the front (6a, 6b) and the rear (6c), of the distribution element of the cleaning device according to the invention in a preferred exemplary embodiment where the distribution element comprises a distribution bar in which is integrated, in particular, a second heating device.

It is first of all to be noted that if the Figures show the invention in a detailed manner for its implementation, they can of course serve to define the invention better should this be necessary. Likewise, it is noted that, for all the Figures, the same elements are designated by the same references. It will also be understood that the embodiments of the invention shown by the Figures are given by way of non-limiting examples. As a result, other configurations of the cleaning device according to the invention can be realized, notably by varying the arrangement and the dimensioning of the constituent elements of said cleaning device according to the invention, in particular, of the rod, the piston and/or of the fluid distribution element.

It is also noted that, in the description below, the designations "upstream" and "downstream" refer to the direction of flow of the fluid in the cleaning device according to the invention. Thus, the designation "upstream" refers to the side of the device according to the invention on which said fluid is taken in, and the designation "downstream" refers to the side of the device according to the invention on which the fluid is distributed outside the same, onto a surface of an optical sensor of an optical detection unit of a motor vehicle.

FIG. 1 illustrates a vehicle 1 which comprises according to the invention a detection unit which is part of a driving assistance system, said detection unit comprising here an optical sensor 2 and a cleaning device 3 according to the invention on the front end of the vehicle 1. The detection unit is arranged here on the front end of the vehicle, notably on the radiator grille.

FIG. 2 shows the cleaning device 3, which is arranged in the vicinity of the optical sensor 2 and of its optical surface 2' and which comprises notably a fluid distribution element 4, here constituted by a distribution bar, which is fixed, by an end portion 4S, to a downstream end of a hollow conveying body 5 which has an elongated form along an axis of elongation X, the hollow conveying body 5 being fixed on a housing 6 of the optical sensor 2.

The distribution element 4 is carried at the end of a movable piston 8 (can be seen in FIG. 3) which is configured to slide inside the hollow conveying body 5 between an extended position and a retracted position such that the distribution element 4 can accordingly take up a cleaning position, in which it is extended in front of the optical surface 2' to be cleaned, the dispensing spouts of the distribution element being oriented such that the cleaning fluid is projected onto the optical surface, and a retracted position, visible in FIG. 2, in which the distribution element is protected and does not impede the detection via the optical sensor 2.

FIG. 3 shows the interior of the hollow conveying body 5 and allows the cooperation between the constituent elements of said telescopic cleaning device 3 to be shown, telescopic as a result of the movement of the movable piston 8.

The telescopic cleaning device 3 is essentially made up, from upstream to downstream following a longitudinal axis (X) of elongation of the cleaning device 3, by a fluid intake nozzle 10, an inlet flange 12, a rod 14 which is joined to the inlet flange 12, the movable piston 8, an elastic resetting means 16 and the distribution element 4 which can be seen in FIG. 2. Each of said components is placed in a position of revolution around the axis of elongation (X) with respect to the hollow fluid conveying body 5.

The hollow fluid conveying body 5 is closed at an upstream end by the inlet flange 12 and it is configured to accommodate the movable piston 8 which is guided in translation along the axis of elongation notably by a guide sleeve 18 arranged in the hollow fluid conveying body 5 at the downstream end.

The fluid intake nozzle 10 is formed projecting from the inlet flange 12, and it extends opposite the hollow conveying body 5, being offset here with respect to the longitudinal axis (X) of the hollow fluid conveying body 5. The intake nozzle 10 has a longitudinal through bore which opens out in the interior of the hollow body 5 into an intake chamber 20 which is delimited at least in part by the inlet flange 12, a peripheral wall of the hollow conveying body 5 and by the movable piston 8.

The inlet flange 12 is configured to close the upstream end of the hollow fluid conveying body 5. A sealing member can be provided for said closure. The inlet flange is configured to support the rod 14 on its inside face, facing the interior of the hollow fluid conveying body 5.

The rod 14 extends jutting out from the inlet flange 12, in the interior of the hollow fluid conveying body 5, so as, on the one hand, to form a translatory guide member for the movable piston 8, which is configured to slide around said rod 14, and, on the other hand, to form part of the translatory driving device of the movable piston under the effect of cleaning fluid pressure injected into the hollow conveying body via the fluid intake nozzle 10. The operation of the telescopic cleaning device according to the invention will be described below.

The rod 14 extends, along the axis of elongation X, jutting out from the inlet flange 12 and it comprises, according to the invention, a heating device 22.

The heating device 22 comprises notably a heating element 24 and a heat conducting hollow cylindrical tube 26 extending along the axis of elongation X, the heating element 24 being accommodated in the interior of the heat conducting hollow cylindrical tube 26. The heating element in the example shown is in the form of a resistive wire, without this limiting the invention when the heating element is accommodated, at least partially, in the interior of a heat conducting tube separate from the heating element.

The heat conducting tube 26 defines the outside casing of the rod 14, and the fluid, which is to flow between the rod and the movable piston when the cleaning fluid pressure present in the hollow conveying body is sufficient to move the movable piston in opposition to the resetting force of the elastic means 16, flows directly against the wall of the heat conducting tube such that the heat released at the wall of the tube by starting up the heating element 24 is transmitted directly to the cleaning fluid traversing the movable piston in the direction of the distribution element 4.

In this way, the rod 14 has a form defined by the profile of the heat conducting tube, namely in this case a cylindrical hollow tube form, with an annular section, the outside peripheral face of which is smooth. The rod is thus hollow over its entire dimension along the axis of elongation, such that a passage opening 28 is arranged at the junction of the heat conducting tube 26 and the inlet flange 12 in order to allow access to the interior of the rod 14.

At the free end of the rod, that is to say the end opposite the inlet flange, the rod is closed by a nozzle 30, attached to the downstream end of the heat conducting tube 26. The nozzle 30 comprises means for holding 32 the heating element 24 so as to ensure, notably, the tension of the resistive wire which forms the heating element here and its position over the entire dimension of elongation of the rod 14. Other characteristics unique to the arrangement of the heating element in the interior of the rod 14 will be described below when the assembly of the unit is described in more detail.

The nozzle 30 comprises a peripheral recess 34 capable of accommodating an O-ring seal 36 so as to allow the piston 8 to slide in a sealed manner along said rod 14 which it surrounds. The O-ring seal 36 is configured to be supported against an inside face of the movable piston 8.

The nozzle is made here of plastic material, given that, according to one aspect of the invention, the heat conducting tube 26 is composed of a heat conducting metallic material, preferably brass or aluminium, in order to transmit the heat released by the heating element 24 to the cleaning fluid made to pass along the outside peripheral face of the rod.

The movable piston 8, in the vicinity of its upstream end facing the inlet flange 12, comprises a crown 38 on the outside wall of which is arranged a peripheral recess 40, capable of accommodating a sealing element 42 so as to allow the mobile piston 8 to slide in a sealed manner in the hollow fluid conveying body 5, and thus to ensure the circulation of the fluid into the interior of the movable piston 8, between said piston and the rod 14. The sealing element 42 is preferably a lip seal, capable of limiting the friction of the movable piston 8 in the hollow body 5.

The movable piston 8 comprises substantially cylindrical portions which can be defined, upstream to downstream, as being an intake part 44 bearing the crown 38, a central part 46 capable of sliding inside the hollow guide sleeve 18 arranged at the downstream end of the hollow fluid conveying body corps 5 and an end distribution part 48, with a smaller diameter.

The movable piston 8 is hollowed out by an interior distribution conduit 50 for the cleaning fluid 50 which comprises, at its upstream end, an upper extended portion 52 which allows the movable piston 8 to slide around the rod 14 and, at its downstream end, a lower portion 54 with a smaller diameter, which allows the cleaning fluid, which is arranged to circulate in the interior of the movable piston 8, to be pressurized for the purpose of its projection from the distribution element 4 onto the optical sensor 2.

The mobile piston 8 is connected, by the fluid distribution end part 48, to the cleaning fluid distribution element 4 which, according to a preferred embodiment of the invention shown in FIG. 2, is constituted by a distribution bar 4 which is fixed to a downstream end of the hollow fluid conveying body 5, that is to say to the fluid distribution end part 48 of the movable piston 8, by an end portion 45. More specifically, the fluid distribution end part 48 of the movable piston 8 is arranged so that the lower portion 54 of the distribution conduit 50 which is arranged in the piston 8 is able to communicate with a fluid distribution channel 56 of the distribution element 4, in particular of the distribution bar, as can be seen in FIGS. 6a to 6c.

The movable piston 8 is mounted in the hollow body 5 around the rod 14 which extends substantially coaxially to the movable piston 8, such that at least the nozzle 30 forming the free end of the rod 14 extends into the interior of the inside distribution conduit 50 of the movable piston 8. The movable piston 8 slides in the hollow conveying body 5 between a fully retracted position, or rest position, and a fully extended position, or cleaning position, under the effect of the pressure of the cleaning fluid arriving in the intake chamber 20 via the intake nozzle 10. An elastic resetting means 16, preferably a helical compression spring, is arranged in the hollow conveying body 5 between the peripheral wall of the hollow body and the movable piston 8, so as to be supported at one end on the bottom of the hollow body 5, around the guide sleeve 18 and at the opposite end on a face of the crown 38. The elastic resetting means 16 is capable of deforming under the effect of the fluid pressure so as to allow the longitudinal movement of the movable piston 8. It is thus understood that in the phase for loading the fluid into the cleaning device 3, the movable piston 8 moves opposite the intake chamber 20 then carries out a reverse restoring movement at the end of the cleaning phase by ejecting the fluid.

The movable piston 8 and/or the rod 14, here the movable piston 8, are configured to comprise through-channels 58 which allow the cleaning fluid to flow in the interior of the movable piston from the intake chamber 20, the variable volume of which is defined depending on the position of the movable piston 8 relative to the inlet flange 12. The though-channels 58 are each formed by a groove, arranged here in the inside wall of the movable piston 8 delimiting the inside distribution conduit 50. It is understood that during the sliding of the movable piston 8 relative to the rod 14, the fluid is blocked in the through-channels as long as the O-ring seal 36, arranged in the nozzle 30 of the rod 14, is situated downstream of the end of said through-channels (as can be seen in FIG. 3), and the fluid is able to escape from the through-channels onto the distribution element 4 when at least one end of the through-channels is situated beyond the O-ring seal 36.

The through-channels 58 can have different axial and/or radial dimensions so as to be able to control the progressive arrival of the fluid in the distribution element 4. The expression "axial dimension" is to be understood as the height of a through-channel 58 in the direction of the longitudinal axis X of elongation of the movable piston 8, whilst "radial dimension" is to be understood as the depth of said through-channel 58 within the thickness of the inside wall of the movable piston 8 in which the through-channels 58 can be arranged.

FIGS. 4 and 5 show the cylindrical rod 14 of the telescopic cleaning device according to the invention in more detail, said rod extends, along the axis of elongation X, jutting out from the inlet flange 12 and which comprises the heating device 22 constituted by the heating element 24 and the heat conducting tube 26.

The heat conducting tube surrounds the heating element 24 and they extend along the axis of elongation X in a centred position with respect to the inlet flange 12.

The heating element 24 extends in the interior of the heat conducting tube 26 from the inlet flange 12 to the nozzle 30 arranged at the end of the heat conducting tube 26.

In the example illustrated, the resistive wire forming the heating element 24 has at the nozzle 30, and thus in the vicinity of the downstream end of the cylindrical rod, a loop shape so as to have two strands extending side by side, respectively traversing the inlet flange at the passage opening 28 (as can be seen in FIG. 3, in which only one of the strands of the heating element can be seen on account of the section). The size of the passage opening 28 is greater than the size of the strands of the heating element 24 pressed against one another.

In this way, the heating element has a U shape with the base arranged at the nozzle 30. Furthermore, the nozzle 30 is provided here with a base 31 intended to be inserted, for example by force, into the heat conducting tube 26, at the downstream end of same, and this base comprises an eyelet configured to be traversed by the heating element at its loop. It is understood that during assembly, the end of the heating element is passed into the eyelet forming the holding opening 32, and the heating element is folded around said eyelet in order to form the loop.

A filling material, of resin or gel type, is injected into the interior of the heat conducting tube, via the passage opening 28, once the heating element 24 has been placed inside the tube 26. Said filling material extends in the tube from the base of the nozzle 30 to the inlet flange, if appropriate overlapping the passage opening 28 in order to spread over the outside face of the inlet flange. In this way, on the one hand, the seal between the inlet flange 12, the passage opening 28 through which the heating element 24 enters and exits, and the interior of the heat conducting tube 26 is ensured, and on the other hand, the position of the heating element inside the heat conducting tube is fixed in order to prevent them from moving during operation.

A method of assembling the heating device which fits the cleaning device according to the invention will now be described. According to a preferred embodiment, the heat conducting tube 26 is overmoulded on the inlet flange 12, which is otherwise made of plastic material. During this overmoulding, the heat conducting tube is arranged in a manner jutting out from the inlet flange around the passage opening 28.

A resistive wire forming the heating element 24 here is then inserted into the inlet flange 12 through the passage opening 28 then pulled, following a first outward trajectory, along the axis of elongation X in the interior of the heat conducting tube 26. When the end of the element overhangs the downstream end of the heat conducting tube 26, the end of the heating element is passed through the opening for holding 32 the nozzle 30 in order to form a loop and be again accommodated in the heat conducting tube 26. The heating element is then slid along the tube, following a second inward trajectory parallel to the first, until traversing the inlet flange 12 again at the passage opening 28. The arrangement of the unit at said stage in the assembly method is shown in FIG. 4. The nozzle 30 is then secured to the heat conducting tube 26 by crimping or screwing or fitting, and the heating element is tensioned at the opposite end at its connector (not shown here), as is shown in FIG. 5.

It is understood that the heating element 24, connected electrically to an electric power source by means of a connector (not shown), is capable of heating the heat conducting tube 26 composed of a heat conducting material, preferably brass or aluminium.

When an optical surface requires cleaning, and cleaning liquid traverses the hollow conveying body 5 between the rod 14 and the movable piston 8, as has been stated previously, it can be activated automatically, on demand from the user, or even following the detection of specific meteorological conditions, the cleaning liquid being heated by means of the heating device that is integrated in the rod 14.

Thus, the function of the cylindrical rod 14, fitted with the heating device 22, apart from its function of guiding the movable piston and its function of controlling the quantity of cleaning liquid moving onto the distribution element, is to heat, by conduction, fluid which penetrates into the cleaning device 3 through an intake nozzle 10 of the inlet flange 12 and which flows along the outside wall of the cylindrical rod 14.

In the embodiment shown, the heat conducting tube 26 has the function of homogeneously distributing the heat to be transmitted to the fluid flow, and it makes it possible to hold the heating element 24 in position, if appropriate with the aid of the nozzle 30 and the filling material.

FIGS. 6a, 6b and 6c show the distribution element 4 of the cleaning device 3 according to the invention constituted, according to a preferred embodiment of the invention, by a distribution bar 4 comprising an additional integrated heating element 60. The distribution bar 4 extends substantially symmetrically on both sides of the axis of elongation X of the hollow conveying body 5. More precisely, the distribution bar 4 comprises, opposite its end portion 45 by means of which it is attached to the hollow conveying body 5, a distribution portion 62 which extends substantially symmetrically, in a transverse direction Y which is substantially perpendicular to the axis of elongation X, on both sides of the downstream end of the conveying body 5 and of said axis of elongation X. The distribution portion 62 is formed by a base 64 which forms a first part which extends the distribution bar 4 and is capable of being assembled, preferably by welding, to a second part which forms a cover 66 so as to define, between said two parts, the fluid distribution channel 56 which comprises in the bottom part a plurality of fluid distribution openings 68 for the ejection of the same onto the optical surface to be cleaned when the distribution element 4 is in the extended position.

The distribution bar 4 is specific here in that it comprises an additional heating device 60 which is integrated into the bar and is independent of the heating device 22 which is present in the rod 14 as has been described previously.

The additional heating device 60 here comprises an additional heating wire 70, which is separate from the heating element 24 accommodated in the tube 26 of the rod 14, and connected electrically to an electric power source by means of a connector which is not shown here.

It is understood that the additional heating wire 70 comprises a part that is inside the distribution bar 4, and a part that is outside the bar which may be connected to the connector. A passage opening 72, realized in the base 64, allows said two parts of the additional heating wire to be connected, whilst allowing the additional heating wire 70 to pass through the base. The diameter of the passage opening 64 is greater than the outer diameter of the additional heating wire.

As shown in FIG. 6b, the part inside the bar of the additional heating wire 70 runs along the fluid distribution channel 56, being held on the inside face of the base 64 of the distribution portion 62, that is to say the face of the base facing the cover 66, by means of a plurality of holding points 74 which are arranged on said inside face of the base.

The length of the part inside the additional heating wire 70 is defined depending on the length of the fluid distribution channel 56 and the length of the part outside the additional heating wire is defined so as to allow the movable piston 8 of the telescopic cleaning device 3 to move in its fully extended position. The outside part of the additional heating wire can be arranged in a sheath so that it does not get snarled up when the distribution element moves into its retracted position.

In accordance with what has been described previously for the heating element 24 and the rod 14, a filling material, of the resin or gel type, can be added into the passage opening 72 in order to ensure the seal between the distribution portion 62, the passage opening 72 and the additional heating wire 70.

It is understood that the cleaning device according to one aspect of the invention comprises at least one heating device which is arranged in the hollow conveying body and more particularly in the rod around which the movable piston slides for the telescopic extension of the distribution element which is carried on the end of said hollow conveying body. It is also possible in an additional manner to provide a first additional heating device such as has just been described with regard to the distribution element, and it is also possible, as an alternative to or in addition to said first additional heating device, to consider arranging a second additional heating device in a cleaning and/or drying fluid conveying conduit which is arranged upstream of the heating cleaning device 3 according to the invention for its supply with fluid, the second additional heating device being in the form of a resistive wire which is connected to a connector and arranged in or on the perimeter of the conveying conduit. It is therefore possible to control the implementation of the one and/or the other of the heating devices in order to adapt to the meteorological conditions, without needing to oversize each of said heating devices. The necessary electric power supply is thus quantified in an accurate and efficient manner, by implementing each of the heating devices in very cold conditions and just the heating device arranged in the hollow conveying body when the temperatures are less extreme.

The above description clearly explains how the invention enables the objectives that it set to be achieved and notably proposes a compact telescopic cleaning device which is capable of improving the cleaning power of a cleaning and/or drying fluid which is projected onto an optical surface of an optical sensor thanks to the arrangement of at least one heating device, which is easy to implement and install, in said cleaning device.

The invention is not limited to the embodiments given specifically by way of non-limiting examples in this document and extends, in particular, to all equivalent means and to all combinations of said means that are technically effective.

The invention claimed is:

1. A telescopic cleaning device for projecting at least one cleaning and/or drying fluid onto a glass surface to be cleaned of a motor vehicle, the telescopic cleaning device comprising:
    at least one hollow conveying body for the cleaning fluid, closed at an upstream end by an inlet flange and accommodating a movable piston which slides in the hollow conveying body, parallel to an axis of elongation of the hollow body,
    the movable piston, hollowed out by an inner distribution conduit, being the carrier of a fluid distribution element at a downstream end,
    wherein the hollow conveying body additionally accommodates a rod which extends jutting out from the inlet flange along the axis of elongation and around which the movable piston is capable of sliding,
    the movable piston and the rod being configured to allow the fluid to flow between them along an outside peripheral face of the rod, depending on the position of the movable piston with respect to the rod, from the inlet flange to the distribution element, and
    wherein the rod comprises a heating device, said heating device comprising at least one heating element extending in the interior of a heat conducting tube, along the axis of elongation.

2. The telescopic cleaning device according to claim 1, wherein the fluid flowing between the rod and the movable piston is set to flow against the outside wall of the heat conducting tube.

3. The telescopic cleaning device according to claim 1, wherein the heating element extends in the interior of the rod from the inlet flange and/or up to the free end of the rod opposite the inlet flange.

4. The telescopic cleaning device according to claim 1, wherein the heating element is a resistive wire.

5. The telescopic cleaning device according to claim 4, wherein the heating element is a resistive wire which forms a loop in the interior of the heat conducting tube.

6. The telescopic cleaning device according to claim 1, wherein the rod comprises an essentially cylindrical nozzle which comprises means for holding the heating element.

7. The telescopic cleaning device according to claim 6, wherein the nozzle is secured to a downstream end of the heat conducting tube by crimping or screwing or fitting.

8. The telescopic cleaning device according to claim 1, wherein a filling material comprising a resin or gel, is arranged at least partially in the interior of the heat conducting tube in order to fix the position of the heating element.

9. The telescopic cleaning device according to claim 1, wherein the heat conducting tube is metallic and made of brass or aluminum.

10. The telescopic cleaning device according to claim 6, wherein the nozzle is made of plastic material.

11. The telescopic cleaning device according to claim 1, wherein the fluid distribution element comprises a distribution bar which is fitted with an additional heating device which comprises an additional heating wire that is separate from the heating element accommodated in the rod.

12. An optical detection system to be fitted in a motor vehicle, said system comprising:
    at least one optical sensor comprising an optical surface; and
    a telescopic cleaning device for the optical surface according to claim 1.

* * * * *